United States Patent [19]

Takeuchi et al.

[11] 4,358,381

[45] Nov. 9, 1982

[54] SLUDGE CONDENSATION AND DEWATERING SYSTEM

[75] Inventors: Tetsuo Takeuchi, Ichikawa; Shoichi Nakamura, Yachiyo, both of Japan

[73] Assignee: Ichikawa Woolen Textile Co., Ltd., Tokyo, Japan

[21] Appl. No.: 219,594

[22] Filed: Dec. 24, 1980

[30] Foreign Application Priority Data

Dec. 28, 1979 [JP] Japan .................... 54-184012[U]

[51] Int. Cl.$^3$ ............................................. B01D 33/04
[52] U.S. Cl. .................................. 210/727; 210/769; 210/770; 210/783; 210/806; 210/173; 210/199; 210/202; 210/203; 210/206; 210/297; 210/327; 210/401; 100/71; 100/118; 100/153
[58] Field of Search ............... 210/723, 769, 726, 770, 210/772, 727, 783, 806, 199, 202, 203, 206, 259, 297, 327, 335, 400, 401, 173; 162/350, 358, 359; 100/71, 74, 75, 96, 97, 116, 118, 119, 120, 121, 151, 152, 153, 154

[56] References Cited

U.S. PATENT DOCUMENTS 3,800,952  4/1974  Bastgen .......................... 210/400 X
4,168,236  9/1979  Bahr ............................... 210/400 X

FOREIGN PATENT DOCUMENTS 1323208  7/1973  United Kingdom ............... 210/506

Primary Examiner—David R. Sadowski
Attorney, Agent, or Firm—Bucknam and Archer

[57] ABSTRACT

A sludge condensation and dewatering apparatus is described which comprises a condensation unit and a dewatering unit. The condensation unit comprises a flocculating reaction tank (1) for forming a sludge flock, a first holding tank (2) slantingly arranged and upwardly inclined along the moving direction of the sludge, a conveyor for conveying the sludge flock from the flocculation tank to the holding tank for retaining the sludge flock produced by the flocculation reaction tank and an endless running screen belt (3) located just below and adjacent to the first holding tank, a dewatering unit, a solidification device (13) in communication with the first holding tank located between the condensation unit and the dewatering unit. The dewatering unit comprises an upper running piled filter cloth (4) and a lower running piled filter cloth (5), a plurality of rolls ($R_1$–$R_{18}$) for tensioning the upper and lower filter cloths and for moving them closer to each other so as to dewater, between the two filter cloths, the condensed sludge produced by the condensation unit, and then for moving the upper and lower filter cloths apart from each other, and guiding the condensed sludge held in place between both cloths, to wind over substantially the entire circumferential surface of a perforated roll (6) having a large diameter, and a plurality of pressure rolls ($P_1$–$P_7$), arranged around the upper and lower filter cloths (4) and (5) and around the perforated roll.

The invention also covers the process for condensing and dewatering a sludge to obtain a cake of low water content.

7 Claims, 4 Drawing Figures

SLUDGE CONDENSATION AND DEWATERING SYSTEM

DETAILED DESCRIPTION OF THE INVENTION

This invention relates to an apparatus for performing a continuous condensation and dewatering treatment on sludge formed from the treatment of industrial waste water, human waste or sewage to produce efficiently dewatered cakes having a high rate of solid content.

As a conventional continuous sludge processing apparatus of the above-described type, there have been employed a condensation apparatus using a combination of an endless screen belt etc. and a dewatering and filtering device having one or more filter cloths and rolls etc. However, such conventional condensation apparatus involves such disadvantages that an expansion of the installation area is unavoidable by an adoption of a large sized condensation device or it is impossible to spread sludge on a screen sufficiently thick. Further, in a dewatering and filtering apparatus of the type of belt-pressing dewatering machine having two sheets of mono-filament filter cloths made of synthetic fibres, for example, the diameters of rolls are made sequentially smaller and two filter cloths are applied in an S-shape between each two rolls, so that when a shearing effect is applied to the sludge due to the difference in angular speeds of each two rolls to perform a dewatering operation, the meshes may be clogged depending on the type of sludge, with the result that the protruding phenomenon of the sludge is produced or the sludge is slipped through the meshes, so that a decreased processing capacity or a decreased rate of recovery of the solid components may be caused.

When the filter cloth is to be cleaned or washed, a poor resilient recovery characteristic of the filter cloth causes a poor cleaning effect and so a high pressure washing or cleaning is to be required. Even where a roll pressing-type dewatering machine having two filter cloths is used in place of the belt pressing-type dewatering machine, sludge is dispersed together with the filtered liquid in a width direction or in the direction opposite to the moving direction of the filter cloth because the pressing rolls are plain rolls and no discharging place is available for the filtered liquid in the surface of each roll, resulting in a reduction in both the processing capacity and the recovery rate of the solid components and also in the production of a cake having a high water content.

The present invention is provided in order to overcome the above described disadvantages and its object is to recover sludge in a thick form in a condensation process by means of a combination of simple devices without occupying an excessive installation space and in turn in a dewatering process to recover a dewatered cake having a low water content in a short dewatering zone irrelevant to the filtering difficulty or easiness of sludge and at the same time to provide a sludge condensation and dewatering apparatus enabling to achieve a high processing capacity and a high recovery rate of solid components per unit width of the filter cloth.

Figure 1:
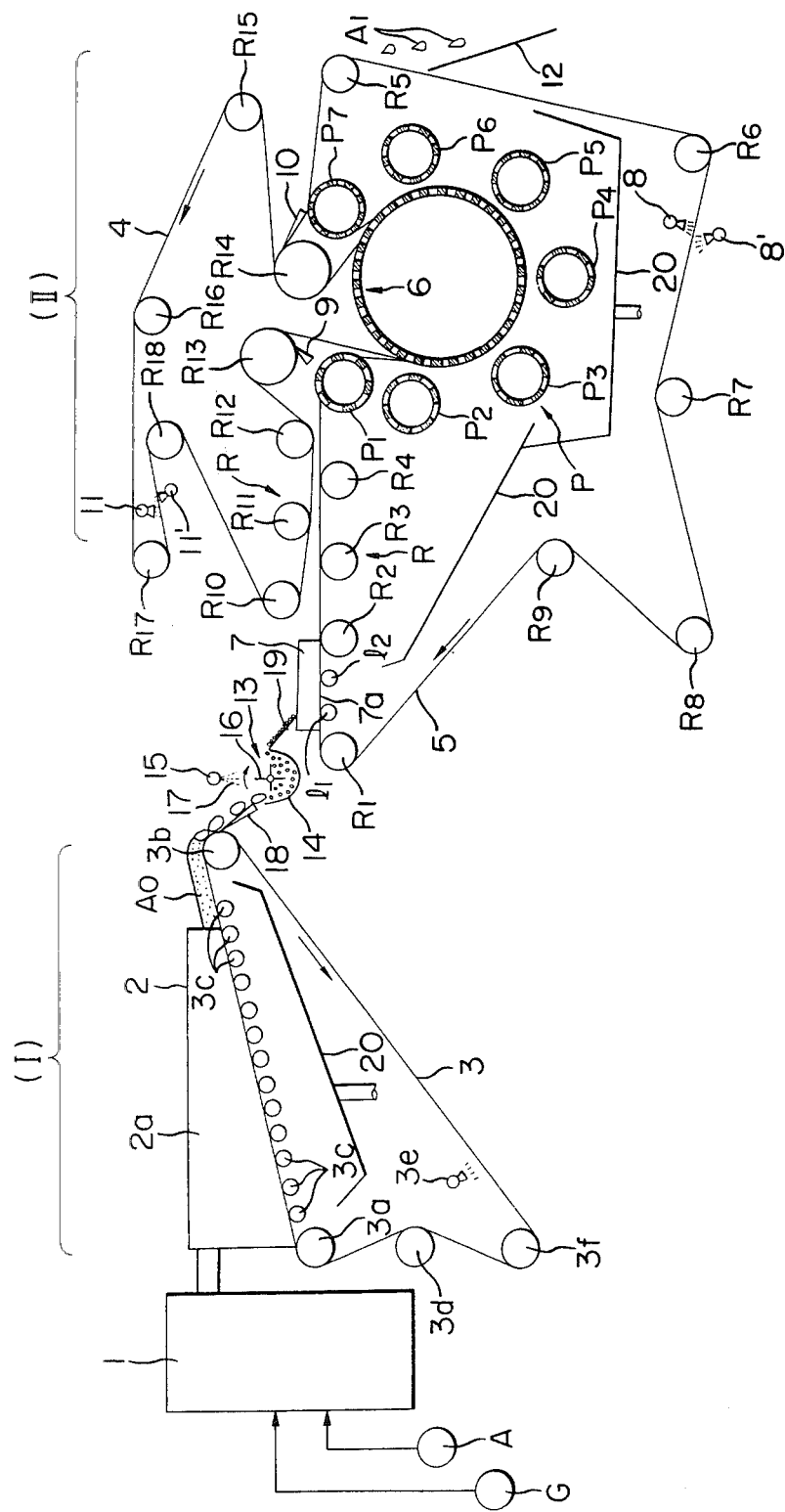
FIG. 1 is a schematic illustration of one preferred embodiment of the present invention.

In reference to the drawings, one preferred embodiment of the present invention will be described hereinbelow.

Reference numeral 1 shows a flocculation reaction tank, in which sludge A and high molecular flocculation agent or flocculation aid G before the initiation of its condensation step are fed continuously by a pump (not shown). An agitator (not shown) provided in the tank is then driven to produce a flocculation flocking. Flocculation flocking produced in the flocculation reaction tank 1 is fed to a slant holding tank 2 and an endless running screen belt 3 located just below said slant holding tank 2 which together constitute a concentration unit I. That is, the slant holding tank 2 is constituted by an elongated bottomless frame 2a having a rectangular shape in plan, the longitudinal direction of which corresponds to the advancing direction of the sludge, the top end surface of the holding tank 2 is kept horizontal, and the lower part of the longitudinal frame constituting the holding tank is inclined linearly at a certain upward angle so as to cause it to extend upward along the moving direction of the sludge and is sealed with a rubber plate in order to prevent leakage of the sludge. The running screen belt 3 is applied over the upper and lower rolls 3b and 3a in such a manner that said endless running screen belt 3 is located right below the slant holding tank 2 at an angle identical to the inclination angle of said holding tank, and a plurality of supporting rods 3c is arranged for supporting the screen belt 3 between the upper roll 3b and the lower roll 3a. The running screen belt is in contact with a tortuous movement correction roll 3d to ensure a stable drive of the running screen belt. The belt is also applied to a roll 3f in order to secure such a space as enabling a sufficient installation of a shower 3e for cleaning the screen belt from the rear side thereof. As the endless running screen belt 3, such a belt as wire net made of stainless steel or phophorus bronze etc. synthetic resin net made of nylon, saran etc. or a belt made by piling short fibres in slant at a surface of such a net may be used. In particular, when a piled slant screen belt made of short fibres is to be used, the belt may be prevented from clogging and the flocculation flocking may efficiently be recovered at the piled portion.

The reason why the holding tank 2 and the screen belt 3 constituting the concentration unit I are inclined at a specified upward angle is to thicken the sludge without driving the screen belt at a high speed, to achieve a far more improved processing capacity due to a flow of liberated water among the flockings of sludge accumulated on the belt, and to minimize the increase in installation area required by lengthening the condensation processing distance. Reference numeral 13 indicates a particulation and solidification device, and as shown in FIG. 1, it is arranged in a transition area between the concentration unit I and a subsequent main dewatering unit II. This particulation and solidification device 13 comprises an agitating and mixing tank 13 and an instillation device 15. The agitating and mixing tank 14 is made of a lateral reservoir having a semi-circular section and provided with a rotary vanes 16. The number of rotation and the rotating direction of the rotary vanes 16 may freely be adjusted. The instillation device 15 is constituted by a pipe of stainless steel or vinyl chloride resin etc. and has a number of small apertures therethrough. The instillation device is operated such that a dewatering aid 17 may be dripped into the agitating and mixing tank 14 through the small apertures in an instillated form.

As the dewatering aids, an inorganic compound such as ferric chloride, ferric sulfate or aluminium sulfate, or a high molecular organic compound such as acrylamide may be applied. Reference numerals 18 and 19 in the drawing indicate a scraper and a shoot, respectively. II indicates a main dewatering unit having an upper running piled cloth 4 and the lower running piled cloth 5 which are arranged in an endless form by a group of rolls ($R_1$ to $R_{18}$). Both of these piled cloths 4 and 5 are closely located with each other in order to remove water from the sludge preliminarily at their former stages, and, in their later stages, are wound over the substantially entire circumferential surface of a perforated roll 6 of a large diameter. A plurality of bar pressing rolls or apertured pressing rolls P or a combination thereof are arranged around the perforating roll 6. Describing this arrangement in detail, the concentrated sludge conveyed from the lower part of the slant surface to the upper extremity thereof by the endless running screen belt 3 in the concentration unit I is transferred to the adjacent particulation and solidification device 13, finely divided there from its block form into finely divided particles, then solidified and stored in a second holding tank 7 constituted by the bottomless frame 7a which is arranged horizontally.

A part of the lower running piled filter cloth 5 is tensioned horizontally by a group of rolls $R_1$, $R_2$, $R_3$ and $R_4$ and a first pressing roll $P_1$ which will be described later. The upper circumferential extremity of each of the rolls $R_1$, $R_2$, $R_3$, $R_4$ and $P_1$ is positioned in a same plane. The second holding tank 7 is arranged at a adjoining position on the belt supported by the rolls $R_1$ and $R_2$, and the supporting rods ($l_1$, $l_2$) arranged therebetween.

The lower running piled filter cloth 5 is applied over a group of rolls $R_5$, $R_6$, $R_7$, $R_8$ and $R_9$, respectively, for providing spacing to install a perforated roll 6 of a large diameter to be described later and showers 8 and 8' for use in cleaning the upper and lower surfaces of the cloth 5 and also for maintaining said filter cloth 5 under a specified tension. Further, the cloth 5 is also applied to the substantially entire circumferential surface of the perforated roll 6 via another pressing roll $P_7$ facing against the pressing roll $P_1$.

On the other hand, the upper running piled filter cloth 4 is applied to the rolls $R_{10}$, $R_{11}$ and $R_{12}$, respectively, in such a way as the cloth 4 gradually approaches in its travelling direction to the lower running piled filter cloth 5 positioned over the rolls $R_3$ and $R_4$, and further applied over a displacement correction roll $R_{13}$ having a slightly larger diameter than that of the roll $R_{12}$ and being arranged slightly, upwardly adjacent to the roll $R_{12}$. Here, any displacement which may occur between the upper and lower filter cloths due to difference in their running speeds is corrected. A doctor blade 9 is arranged below the displacement correction roll $R_{13}$ to scrape off sludge adhered to said roll. The upper running piled filter cloth 4 applied to the roll $R_{13}$ is applied over substantially entire circumferential surface of the perforated roll 6 of the large diameter with the cloth 4 being located on the roll 6 and being overlapped with said lower running piled filter cloth 5, and then applied together to the substantially entire circumferential surface of the perforated roll 6 of the large diameter. The cloth 4 is then applied to a peeling-off roll $R_{14}$ whose lower circumferential extremity is located on an extension of the leading end of the cloth 4 just let out from the perforated roll 6. The roll $R_{14}$ also serves to rectify any displacement of said upper cloth 4. The leaving positions of the two filter cloths 4 and 5 applied over the perforated roll 6 therefrom are set such that the lower filter cloth 5 leaves it earlier than the upper filter cloth 4, thereby to cause sludge to move in sequence onto the upper filter cloth 4. Further, sludge cakes guided by a scraper 10 provided with the peeling-off roll $R_{14}$ are moved onto the lower filter cloth 5 at a position between the pressing roll $P_7$ and the roll $R_5$.

Figure 2:
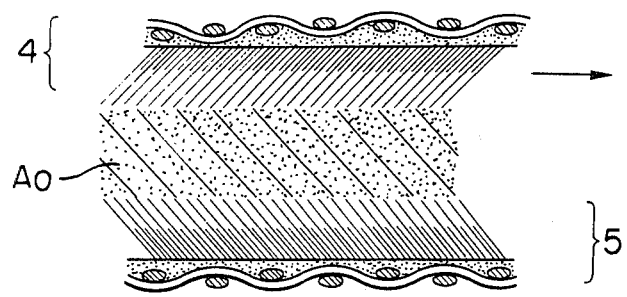
FIG. 2 is an enlarged sectional view which shows material for instance being sludge held between the upper piled filter cloth and the lower piled filter cloth.

The running upper piled filter cloth 4 is kept such that a specified tension is applied thereto by a group of rolls $R_{15}$, $R_{16}$, $R_{17}$ and $R_{18}$. Along the travelling course of said upper cloth 4, showers 11 and 11' are provided for use in washing or cleaning the upper and lower surfaces of the filter cloth 4. As the piled filter cloths 4 and 5, may be used such a cloth as having short fibres planted aslant on a foundation fabric of a relatively coarse net. With respect to this piled filter cloth, British Pat. No. 1,323,208 may be referred. This piled cloth has a superior water-filtration property, is free from clogging and may easily be revived. The two filter cloths are applied in such a way as the base portions of the piles are located more forward than the upper ends thereof viewed from the advancing direction of the filter cloths and then the sludge is introduced between the filter cloths (see FIG. 2).

Thus, as the pressing pressure to be applied to the sludge introduced between the piled filter cloths is increased, the piles fall down (compressed) onto the foundation fabric, with the result that the surface of each filter cloth, said surface being in contact with the sludge, are covered with extremely fine piles, the sludge does not enter into the piles, but only the liquid filtrate is discharged out of the filter cloths through the fine capillary tubes in the piles. As the perforated large diameter roll 6, it may be possible to use either one of the two types of rolls, i.e., a large diameter bar roll and a large diameter porous roll. In the present embodiment, a large diameter bar roll is illustrated. The large diameter bar roll is of a hollow cylindrical structure in which bars having a rectangular or round section are equally spaced apart in a same circumferential plane along the width direction thereof, and has the same structure as that of bar pressing rolls to be described later but has a larger diameter than the bar pressing roll. Due to this arrangement, the liquid filtrate may be discharged out through the clearances between the bars and so it is possible to keep spreading of dewatered cake to be caused by the movement of liquid filtrate as minimum as possible. Expansion of dewatered cake due to the pressing pressure can be decreased by the clearances between the bars.

On the other hand, the large diameter porous roll is made such that a number of through-holes are drilled through the wall of a plain roll, the water contained in the cake held between the upper and lower piled filter cloths is discharged out through each of the through-holes in the large diameter porous roll and the porous pressing roll $K_3$, and also an expansion of the cake is restricted by the through-holes.

Figure 3:
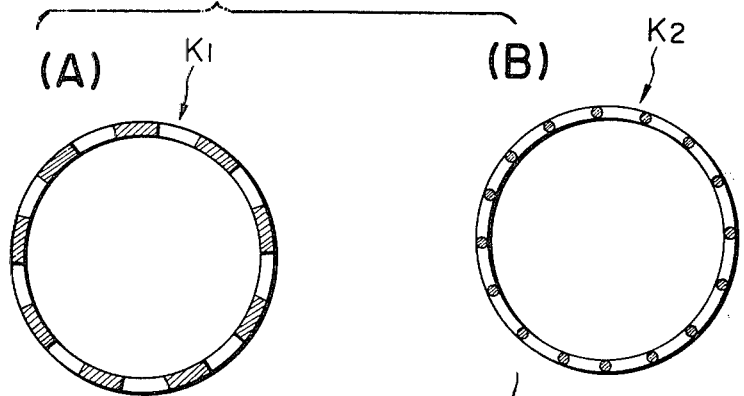
FIGS. 3A, 3B and 3C show each an embodiment of the pressing roll in cross-section.
Figure 4:
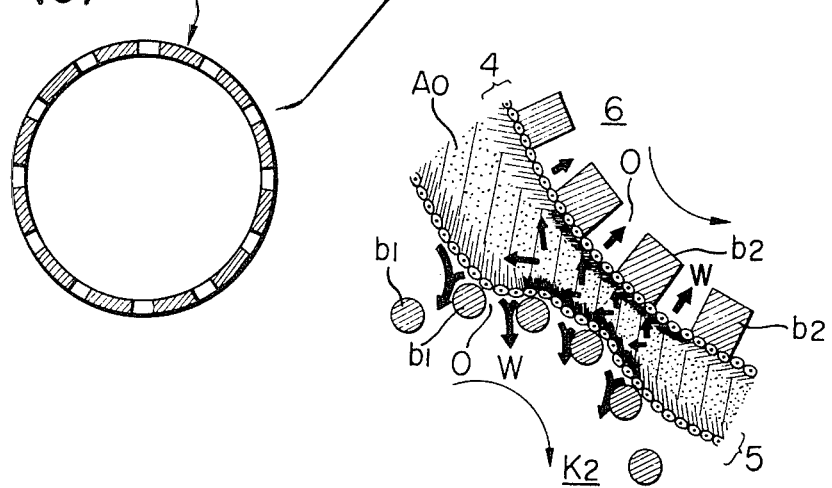
FIG. 4 is an enlarged illustration of a squeeze-dewatering mechanism for cake.

As a group of pressing rolls $P_1$ to $P_7$, bar rolls $K_1$ made of bars having a rectangular cross-section (see FIG. 3A), bar rolls $K_2$ made of bars having a circular cross-section (see FIG. 3B) or porous rolls $K_3$ (see FIG. 3C) or a combination of these rolls may be employed. The pressing pressure of each of the pressing rolls is determined in such a manner that the pressing pressures increase gradually toward the advancing direction of the sludge or the pressure of each of the latter pressing rolls $P_5$ to $P_7$ is set higher than that of each of the former pressing rolls $P_1$ to $P_4$. Where, as in the conventional system, the large diameter roll and the pressing rolls are constituted by plain rolls, discharging directions of the liquid filtrate are limited and the discharge of the liquid filtrate is so difficult that the sludge is susceptible of moving in the direction opposite to the its normal advancing direction or in the width direction of the filter cloths. However, when the large diameter roll and the pressing rolls are constituted by bar rolls or porous rolls as in the case of the present invention, the sludge becomes held in the clearance along with the filter cloths, the surface of each of the filter cloths, which surface is not in contact with the sludge, is released from its contact with roll surfaces, so that the discharge of squeezed-out water may easily be performed and no discharge of the sludge (in the direction opposite to the moving direction of the sludge or the lateral direction) is found, and the filtered liquid may smoothly be discharged from the rear or back surfaces of the filter cloths through the clearances. That is, a compressing and dewatering mechanism in the case that each of the large diameter roll and the pressing roll is a bar roll is, as shown in FIG. 4, operated such that when the upper and lower running piled filter cloths 4 and 5 having a layer of piles with superior compression and recovery characteristics and also having a relatively high thickness as well as the condensed sludge $A_o$ held therebetween are guided into a nip clearance between the large diameter bar roll 6 and the bar pressing roll $K_2$ and compressed, the water content of the sludge will be squeezed out by a thrust of the fine bar $b_1$ forming the bar pressing roll $K_2$ and proceeding into the sludge in its thickness direction through the lower piled filter cloth 5, then will be flowed in a direction indicated by a large arrow and further discharged out from the rear surface of each filter cloth as filtered liquid W through clearance O between the bars of the large diameter bar roll 6 and the bars of the bar pressing roll $K_2$, i.e. $b_1$, $b_1$ ... and $b_2$, $b_2$ ....

In this way, the fine bars of the bar pressing rolls are proceeded into the sludge in its thickness direction through the lower piled filter cloth and exert squeezing forces to the sludge, resulting in localized, intermittent application of a high nip pressure, and a shearing effect and a corresponding water discharging effect to the sludge, and thereby such a sludge as having a high degree of fluidity and a very difficult filtration characteristic and causing non-reversible deformation may be easily and effectively compressed and dewatered.

In this case, if the distance between each two bars of the pressing rolls $P_1$ to $P_7$ is set in such a way that it narrows gradually as the dewatering of the condensed sludge proceeds, the dewatering may gradually be performed while the spreading of the sludge is restricted as the pressing pressure is increased successively, thus providing a dewatered cake having a low rate of water content. When porous rolls are to be used as the pressing rolls, a better dewatering performance would be provided if the hole diameters, are gradually decreased as the dewatering process proceeds. Reference numeral 12 indicates a cake shoot for receiving cakes $A_1$ dropped from the filter cloth on the roll $R_5$. In the drawing, reference numeral 20 shows a filtrate pan.

In operation, the present invention is performed in the arrangement described above where the sludge A and the flocculant G are fed to the flocculation reaction tank 1 and agitated by an agitator in the tank to form the flocculation flocking. Then, the flocculated flocking produced in the flocculation reaction tank 1 is guided onto the slant holding tank 2 installed on the endless running screen belt. Here, the separated water is continuously discharged out of the tank through the net of the screen. In this way, the sludge is condensed by the slant holding tank and discharged out as a dimensionally-thick sludge, then transmitted up to the uppermost position of the endless running screen belt 3. The sludge is scraped off at the uppermost position by the scraper 18 near the uppermost end of the endless running screen belt 3, then dropped into the agitating and mixing tank 14 as lumps. In the agitating and mixing tank 14, the condensed lumpy sludge $A_o$ is mixed with the dewatering aid 17 dripped from the instillator 15 while being agitated by a rotation of the rotary vane 16. In this way, the condensed sludge $A_o$ is finely divided and solidified from a lumpy form into fine particles owing to the flocculation action of the dewatering aid and its rotation caused by the rotary vane. Since thus-formed sludge particles have still not been sufficiently dewatered, the sludge is further guided into the next main dewatering unit II via the shoot 19. Thus, the finely divided and solidified sludge particles are guided into the second holding tank 7 and a feeding width of the sludge which is fed to the next main dewatering unit II is determined there. The condensed sludge is discharged out of the second holding tank 7, gradually moved in response to a running speed of the lower piled filter cloth 5, held between the upper and lower filter cloths guided by the groups of rolls $R_2$, $R_3$, $R_4$ and $R_{10}$, $R_{11}$, and $R_{12}$, and any free water contained therein is discharged therefrom to perform a preparatory dewatering operation. Then, the lower piled filter cloth 5 passed over the roll $R_4$ is passed over the pressing roll $P_1$, wound around substantially entire circumferential surface of the perforated large diameter roll 6 and moved therealong. In turn, the upper piled filter cloth 4 passed over the roll $R_{12}$ is at first passed over a displacement correction roll $R_{13}$ in order to prevent it from overlapping with the lower piled filter cloth by the pressing roll $P_1$, the upper piled filter cloth 4 is wound around the perforated large diameter roll 6 in such a manner that the upper cloth 4 is positioned inside the lower piled filter cloth 5 and then the cloths are driven. The upper and lower piled cloths 4 and 5 wound around substantially entire circumferential surface of the perforated large diameter roll 6 cause said sludge to be gradually dewatered while the same being gradually pressed by the perforated large diameter roll 6 and a group of pressing rolls $P_2$ to $P_7$ with the preliminarily dewatered and condensed sludge being held therebetween. The resulting dewatered sludge further travels over the peeling roll $R_{14}$ while being kept in adhesion to the upper piled filter cloth and then dropped, as dewatered cake $A_1$, onto the lower piled filter cloth 5 contacted with the pressing roll $P_7$ by the scraper 10.

Thus produced dewatered cake will drop down on the cake shoot 12 by its own weight while the lower piled filter cloth 5 is passed over the roll $R_5$. The upper piled filter cloth 4 passes over the roll $R_{17}$, is cleaned and refreshed by the showers 11 and 11', and moves up to a group of rolls $R_{10}$, $R_{11}$, $R_{12}$ again and a similar operation will be repeated. The lower piled filter cloth 5 also passes over the roll $R_6$, is cleaned and refreshed by the showers 8 and 8', moves to a group of rolls $R_1$, $R_2$, $R_3$ and $R_4$ and a similar operation will be repeated.

In the present invention, as apparent from the above description, a concentration unit is constituted by a slant holding tank for use in holding the flocking of the sludge produced in the flocculation reaction tank and by an endless running screen belt closely adjacent to and just below the slant holding tank, so that it is possible to efficiently make sludge dimensionally thick along the slant surface of the belt without need for a high speed running of the screen belt as required in the conventional system. Further the separated water is allowed to flow out while being filtered among the flocks of sludge other than being discharged out through the screen. Therefore, a considerable improvement is expected to the processing capacity for the concentration of sludge. Further, the slant holding tank is constituted by an elongated frame of a rectangular shape in plan view, its lower part is linearly inclined at a specific upward angle, so that the effective distance of filtration is correspondingly elongated. Further the installation area is not so large as expected and further is achieved an improved screening operation.

In turn, at the main dewatering unit, the upper running piled filter cloth and the lower running piled filter cloth which are endlessly tensioned by a group of rolls are closely adjacent with each other in such a way that the condensed sludge produced at the condensation unit may be dewatered preliminarily between the upper and lower filter cloths, and both filter cloths are then separated again from each other. The sludge dewatered preliminarily is guided between the filter cloths in order to forcedly dewater the sludge. The upper and lower cloths with sludge held therebetween are then wound over the substantially entire circumferential surface of the perforated large diameter roll. A plurality of bar pressing rolls or porous pressing rolls or a combination thereof are arranged around the perforated large diameter roll. Accordingly, after the condensed, dimensionally thick, block-like sludge produced in a condensation process is finely divided and solidified, a proper pressing force is applied onto both surfaces of the sludge in a process of preparatory dewatering so as to enable an effective dewatering of the water contained in the sludge through each of the upper and lower piled filter cloths and thus it becomes possible to perform a dewatering of the cake in a short zone. Further, the cake dewatered in advance and guided between both filter cloths is applied on the perforated large diameter roll with both a shearing effect provided by the filter cloths per se and a pressing effect produced by the pressing rolls, in the case of bar pressing rolls, the filter cloths and the sludge are squeezed in the clearances of the perforated large diameter roll and the pressing rolls due to the fact that they produces a squeezing effect which can be obtained only by causing fine bars to penetrate into the sludge through piled filter cloths having a large thickness and sufficient characteristic of compression and recovery. Such effects may be provided as the pressure to be applied to the cake is gradually increased while restricting the spreading of the cake itself and a cake having a high rate of solid components may be produced under a high processing capacity.

Since, in the present invention, both filter cloths are brought close to each other to perform a preliminary dewatering operation and both filter cloths are then separated from each other, a displacement between the upper and lower filter cloths caused by a difference in their running speeds may be corrected. As a result, the filter cloths can be prevented from becoming loose or developing wrinkles, thereby making a continuous operation possible and achieving a substantial improvement in the working efficiency.

The present invention is considered to be effective in that, owing to the adoption of filter cloths each formed by planting short fibres aslant on a surface of a net-like foundation fabric, the planted fibres have characteristic compressability and recovery, and the filter cloths are not stained due to their self-cleaning function and the clogging problem of conventional filter cloths has thus been solved Further, since an effective dewatering can be performed in a short zone at the main dewatering unit, another advantage is achieved because the installation of the apparatus according to this invention does not require too much space.

1 . . . flocculation reaction tank
2 . . . slant holding tank
3 . . . endless running screen belt
4 . . . running upper piled filter cloth
5 . . . running lower piled filter cloth
6 . . . perforated large diameter roll
P . . . a group of pressing rolls
I . . . concentration unit
II . . . main dewatering unit

What is claimed is:

1. The process of condensing and dewatering a sludge to obtain a cake of low water content which consists of feeding the sludge to a flocculation reaction zone and mixing said sludge with a flocculation agent in said flocculation reaction zone to thereby form a sludge flock, introducing said sludge flock from said flocculation reaction zone into a holding zone, thickening said sludge flock in said holding zone by passing said sludge flock on a running endless belt filter inclined upwardly in the direction of flow of said sludge flock whereby a condensed lumpy sludge is obtained, dewatering said condensed lumply sludge by addition thereto of a dewatering aid material and comminuting whereby said lumpy sludge is converted into a finely divided form sludge, carrying said finely divided sludge between two filter cloths which travel for a portion closely arranged to each other and converging toward each other, for a portion diverging away from each other and for a portion wound around a large perforated roll (6) with the condensed sludge between said two filter cloths, applying pressure to said filter cloths by means of pressing rolls located around said large roll (6) in amount increasing along the direction of travel of the condensed sludge, the filter cloths being formed of short fibers on a surface of a foundation fabric oriented traversely to a plane which is perpendicular to the filter cloth surface, and squeezing water out through each of the filter cloths from the clearances between said large perforated roll (6) and said pressing rolls.

2. A sludge condensation and dewatering apparatus comprising a condensation unit means which comprises a flocculating reaction means (1) for forming a sludge flock, a first holding tank means (2) having a substantially horizontal top and decreasing in depth along the direction of movement of said sludge flock, means for conveying said sludge flock from said flocculation reaction means to said holding tank means for retaining the sludge flock produced by said flocculation reaction means and an endless running screen belt (3) located just below and adjacent to said first holding tank means to form a sludge flock container therewith, a dewatering unit means, a particulation and solidification means (13) in communication with said first holding tank means and said dewatering unit means, located between said condensation unit means and said dewatering unit means, said dewatering unit means comprising an upper running piled endless filter cloth belt (4) and a lower running piled endless filter cloth belt (5), said upper and lower filter cloths both winding around a perforated roll (6) in a manner that the lower filter cloth (5) is partially above the upper filter cloth (4) while the sludge is held in place between said cloths, the lower filter cloth (5) moving away from said perforated roll at a point upstream of the point where the upper filter cloth moves away from said perforated roll, a plurality of rolls ($R_1$) ($R_2$) ($R_3$) ($R_4$) arranged for tensioning said lower filter cloth (5) and a plurality of rolls ($R_{10}$) ($R_{11}$) ($R_{12}$) arranged for tensioning said upper filter cloth (4) during travel of said filter cloth belts where said upper cloth (4) is above said lower filter cloth (5) while said sludge is held therebetween; a displacement correction roll ($R_{13}$) located along the travel of said upper filter cloth upstream of said perforated roll (6) and above at least one of said rolls ($R_{12}$) arranged for tensioning said upper filter cloth, a peeling off roll ($R_{14}$) located along the travel of said upper filter cloth downstream of said perforated roll (6), said upper filter cloth arranged over said displacement correction roll ($R_{13}$) and said peeling off roll ($R_{14}$) during portions of travel where said cloths move away from each other and said lower filter cloth (5) is totally under the travel of said upper filter cloth (4) the sludge remaining on said peeling off roll ($R_{14}$) blade means associated with said peeling off roll ($R_{14}$) for transferring said sludge onto said lower filter cloth (5), a plurality of rolls ($R_{15}$), ($R_{16}$), ($R_{17}$), ($R_{18}$) arranged for tensioning said upper filter cloth (4) and a plurality of rolls ($R_5$), ($R_6$), ($R_7$), ($R_8$), ($R_9$) arranged for tensioning said lower cloth (5) in the portion of travel of said cloths away from each other downstream from said perforated roll (6), a plurality of perforated pressure roll means ($P_1$-$P_7$) arranged around said upper and lower filter cloths (4 and 5) and around said perforated roll (6) for increasing pressure on said filter cloths and sludge in the direction of forward motion of said sludge.

3. The apparatus according to claim 2 wherein the screen of said screen belt (3) is made of a pile of short fibers slantingly arranged.

4. The apparatus according to claim 2 wherein said first holding tank (2) has a bottomless frame (2a).

5. The apparatus according to claim 2 wherein said filter cloths (4) and (5) consists of short fibers slantingly arranged on a foundation fabric or a coarse net.

6. The apparatus, according to claim 2, wherein said pressure roll means ($P_1$-$P_7$) comprise pressure bars having a rectangular cross-section.

7. The apparatus, according to claim 2, wherein said pressure roll means ($P_1$-$P_7$) comprise pressure bars having a circular cross-section.

* * * * *